US005996904A

United States Patent [19]

Smeraldi

[11] Patent Number: 5,996,904

[45] Date of Patent: Dec. 7, 1999

[54] FAN-SHAPED DIFFUSER FOR ATOMIZERS OR MIST BLOWERS OF TREATMENT LIQUIDS IN AGRICULTURE

[75] Inventor: Paolo Smeraldi, Montescano, Italy

[73] Assignee: CIMA S.p.A., Maria Della Versa, Italy

[21] Appl. No.: 08/965,424

[22] Filed: Nov. 6, 1997

[51] Int. Cl.[6] .......... B05B 9/00

[52] U.S. Cl. .......... 239/77; 239/172; 239/543; 239/568; 239/595

[58] Field of Search .......... 239/77, 172, 418, 239/424, 433, 548, 543, 566, 568, 592–595

[56] References Cited

U.S. PATENT DOCUMENTS

| | | | |
|---|---|---|---|
| 2,770,501 | 11/1956 | Coanda . | |
| 3,517,888 | 6/1970 | Mitterer | 239/77 X |
| 3,625,426 | 12/1971 | Swanson | 239/77 |

FOREIGN PATENT DOCUMENTS

| | | | |
|---|---|---|---|
| 1232915 | 10/1960 | France . | |
| 1498536 | 10/1967 | France . | |
| 2007576 | 1/1970 | France . | |
| 2097675 | 3/1972 | France . | |
| 2 721 536 | 12/1995 | France . | |
| 2720896 | 12/1995 | France . | |
| 581135 | 8/1958 | Italy | 239/77 |
| 694142 | 9/1965 | Italy | 239/77 |
| 8701909 | 4/1987 | WIPO | 239/170 |
| 8801539 | 3/1988 | WIPO | 239/77 |
| WO 96/22155 | 7/1996 | WIPO . | |

*Primary Examiner*—Andres Kashnikow
*Assistant Examiner*—Steven J. Ganey
*Attorney, Agent, or Firm*—Young & Thompson

[57] ABSTRACT

A diffuser (D) for atomizers or mist blowers of treatment liquids in agriculture, includes a large tube (1) fed with air under pressure, ending into a narrow fan-shaped opening (2), and elements to cause the treatment liquid to flow into the fan-shaped opening (2) at a very low pressure. The elements include a plurality of sectors (3) for liquid distribution, each of them consisting of two straight tube lengths (4) of synthetic plastic material, provided with gauged holes (5) and mutually connected so as to form a very wide angle between them, and substantially at 90° with a feeding duct (6). The sectors (3) are positioned in succession, in one or more side-by-side rows, along the narrow fan-shaped opening (2), substantially at its center.

8 Claims, 5 Drawing Sheets

FAN-SHAPED DIFFUSER FOR ATOMIZERS OR MIST BLOWERS OF TREATMENT LIQUIDS IN AGRICULTURE

BACKGROUND OF THE INVENTION

The present invention concerns a fan-shaped diffuser for atomizers or mist blowers of treatment liquids in agriculture.

There are already known to be various types of mist blowers or atomizers for treatment liquids to be sprayed on any kind of cultivation (such as fruit trees, vineyards, vegetables, strawberry cultivations, and the like), mounted on wheels to be drawn along the fields, or without wheels and carried through the fields by farm tractors. Among said mist blowers or atomizers, the ones using the so called "low volume" system have successfully developed due to their advantageous characteristics. In such atomizers or mist blowers: on one hand, air is fed at high pressure into a large tube ending into a short narrow duct, where the air blows at a very high speed; on the other hand, said treatment liquid is caused to flow at very low pressure towards delivery holes provided into said narrow duct. In various accomplishments of the Applicant, said narrow duct has the characteristics of a real diffuser, acting as a Venturi tube in order to spray the treatment liquid in tiny drops, with the most rational use of said liquid and thereby avoiding any waste thereof.

There are many practical accomplishments of said diffusers, but the ones produced by the Applicant which have proved to be particularly efficient are the diffusers in which the distribution of the treatment liquid is obtained by placing into the narrow duct, wherein air flows at high speed, a small copper tube having aligned, gauged and equidistant holes on its surface. In some of said diffusers, the narrow duct is fan-shaped and the small tube is placed along its fan-shaped opening.

This arrangement has however proved to involve two serious drawbacks: the first one due to the fact that, especially in certain working positions of the diffuser, the liquid tends to spread in said tube in a scarcely uniform manner and is thus distributed in a fully irregular way through the various gauged holes; the second one due to the fact that said holes tend to become wider, especially with some treatment liquids having corrosive properties, they prevent a correct spraying action and thus comprise the proper working of the mist blower.

SUMMARY OF THE INVENTION

The present invention faces and solves these problems by supplying a diffuser for atomizers or mist blowers of treatment liquids in agriculture—of the type comprising a large tube fed with air under pressure, ending into a narrow fan-shaped opening, and means to cause the treatment liquid to flow into said fan-shaped opening at a very low pressure—characterized in that, said means comprise a plurality of sectors for liquid distribution, each of them consisting of two straight tube lengths of synthetic plastic material, provided with gauged holes and mutually connected so as to form a very wide angle between them, and substantially at 90° with a feeding duct, said sectors being positioned in succession, in one or more side-by-side rows, along said narrow fan-shaped opening, substantially at the center thereof.

In said fan-shaped diffuser, the tube lengths of the liquid distribution sectors preferably have a substantially wing-shaped section, with the trailing edge facing outwardly.

Advantageously, said substantially wing-shaped section of the two tube lengths of the liquid distribution sectors can be formed as an outwardly dripping section.

Suitably, moreover, the holes of said sectors are equidistant, each tube length of the sectors being provided with a plurality of opposite gauged holes.

BRIEF DESCRIPTION OF THE DRAWINGS

The invention is now described in further detail, with reference to some preferred embodiments thereof, illustrated on the accompanying drawings, in which.

DESCRIPTION OF THE PREFERRED EMBODINENTS

Figure 1:
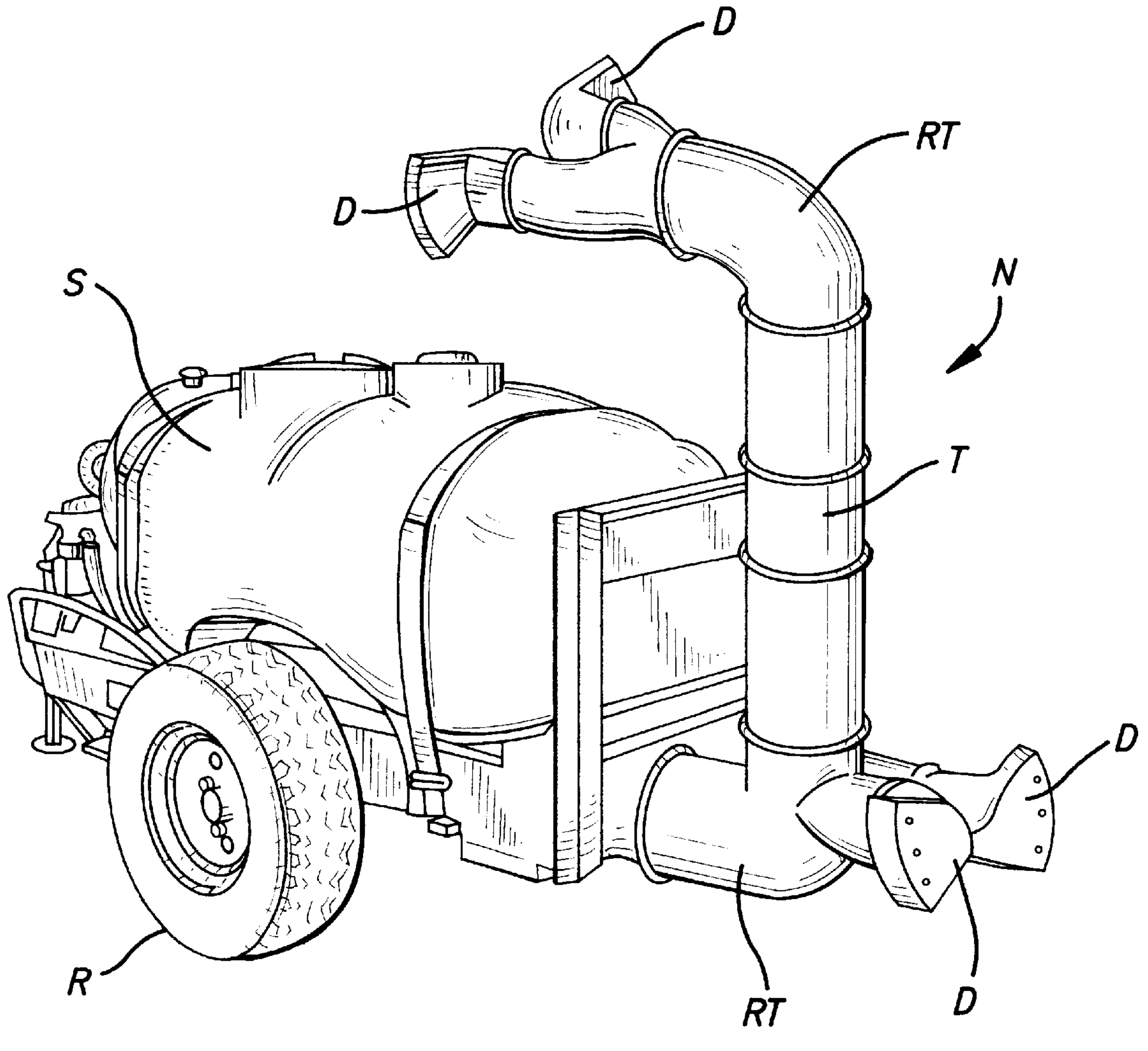
FIG. 1 shows an atomizer for treatment liquids to be sprayed on cultivations, mounted on wheels to be drawn along the fields and equipped with fan-shaped diffusers according to the invention.

With reference to the drawings, FIG. 1 shows an atomizer N (or mist blower) for treatment liquids, mounted on wheels R and apt to be drawn along the fields by means of a farm tractor, or like, in order to spray the liquids on cultivations of any kind (such as fruit trees, vineyards, vegetables, and so on). As seen, the atomizer N comprises a tank S for the treatment liquid and a plurality of fan-shaped diffusers D, carried by suitable pipe fittings RT of a large tube T, through which a blower (not shown) feeds great quantities of air at high speed. A pump (also not shown) feeds the treatment liquid at a very low pressure, from the tank S to the diffusers D, through suitable ducts (not shown on the drawing).

Figure 2:
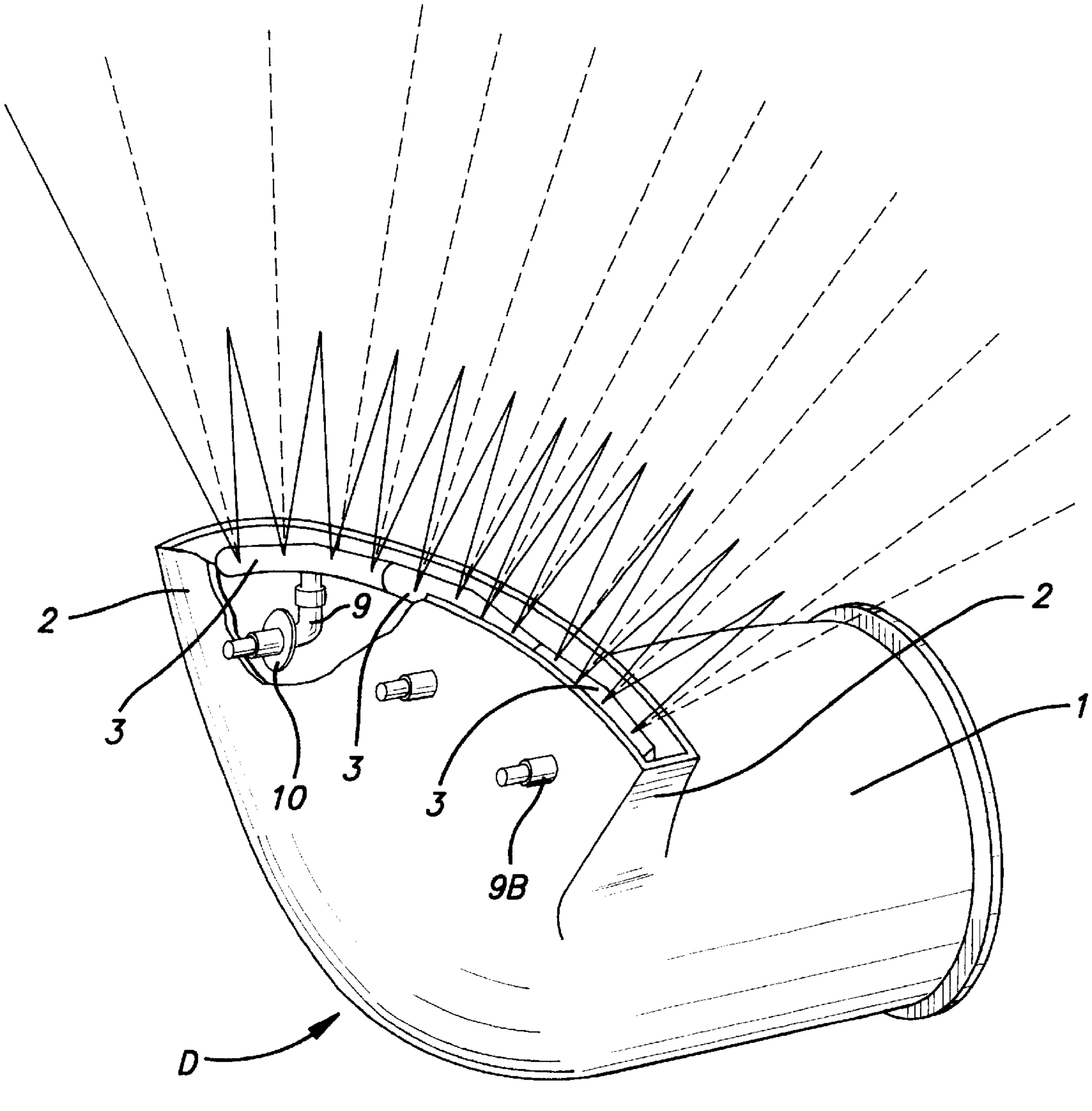
FIG. 2 is a perspective view, with some interrupted parts, of a first embodiment of the fan-shaped diffuser according to the invention.

As shown in FIG. 2, the fan-shaped diffuser D according to the present invention comprises a large cylindrical tubular body 1, square bent so as to end into a narrow fan-shaped opening 2, which carries at its centre means causing the inflow of the treatment liquid. Such means consist of a plurality of sectors 3 for liquid distribution (FIG. 2 shows three aligned sectors, but there could also be four or five sectors and they could be arranged in two or three side-by-side rows, instead of only one row). Each of said sectors consists of two straight tube lengths 4 of synthetic plastic material—shown in FIG. 3—provided with gauged holes 5, and mutually connected so as to form a very wide angle between them. In said sectors 3, a feeding duct 6 ending with an internally threaded bush 7 (see FIG. 4) is connected to said tube lengths 4 substantially at 90°. The tube lengths 4 of the sectors are closed at their outermost ends by plugs 8 applied by forcing or glueing.

As already mentioned, the sectors 3 are mounted in succession along the fan-shaped opening 2, at the center thereof. Each sector 3 is mounted onto an elbow-shaped support duct 9 with externally threaded ends 9A and 9B (see FIGS. 2 and 3). The threaded end 9A of each support duct 9 engages by screwing into the threaded bush 7 of the corresponding sector 3; while the threaded end 9B, carrying at the base a wide flange 10, is used for fixing the duct 9 to one of the walls of the fan-shaped opening 2 of the diffuser D, which it crosses through suitable holes (see FIG. 2) and to which it can be blocked by a nut (not shown).

Figure 5:
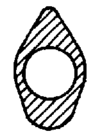

Advantageously, the tube lengths 4 of the liquid distribution sectors 3 of the diffusers D have a substantially wing-shaped section, with the trailing edge facing outwardly of the fan-shaped opening 2. The wing-shaped section is preferably formed as an outwardly dripping section (see FIG. 5). Moreover, each of said tube lengths 4 of the liquid distribution sectors 3 comprises two pairs of opposite gauged holes 5 (FIG. 3), said holes 5 being preferably equidistant. It is however possible to provide for more, differently arranged, gauged holes 5.

A diffuser like the one described and illustrated entirely eliminates the inconveniences of the known diffusers, since the fact of dividing the liquid distribution means into a plurality of short sectors guarantees a uniform distribution of the treatment liquid in the mist being formed at the outlet of the diffuser, which is totally satisfactory for any condition and position of said diffuser; while the fact of producing said sectors of plastic material, practically not subject to corrosion, guarantees a steady gauge of the holes distributing the treatment liquid, whichever liquid it may be.

But the diffuser according to the invention has other advantages compared to those of prior art: the particular design of the liquid distribution sectors 3 forming a very wide angle between them, the design of the wing-shaped section for the tube lengths 4 forming said sectors, and the particular arrangement of the sectors 3 in the narrow fan-shaped opening of the diffuser, allow to spray the liquid—which reaches the holes 5 of said sectors almost without any pressure—when the air goes through the fan-shaped opening at very high speed, in an extremely fine and evenly distributed manner over the whole width of said fan-shaped opening, as has been accurately proved by practical tests. The mist which reaches the cultivations to be treated is thus formed of a far higher number of drops, much tinier than usual, distributed in a perfectly uniform manner. This allows to carry out a treatment on the cultivations which is definitely improved compared to the past, with a very limited consumption of liquid.

Figure 3:
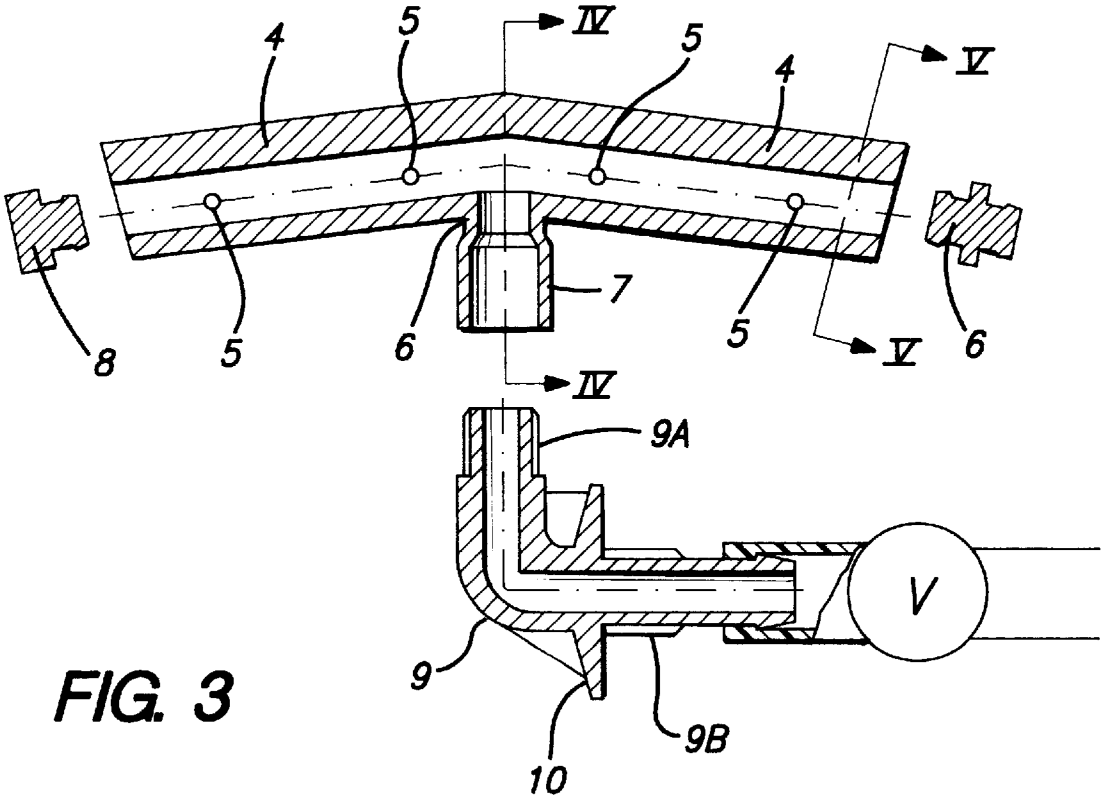
FIG. 3 is an axial section view of one of the liquid distribution sectors of the diffuser shown in FIG. 2.
Figure 4:
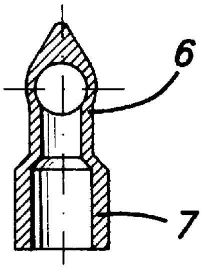
FIGS. 4 and 5 are cross section views along the lines IV—IV and, respectively, V—V of FIG. 3.

The diffuser according to the invention is also much more flexible, compared to those of prior art, for what concerns its use: it is in fact possible to regulate the width of the operative angle of the diffuser by simply controlling the feeding of the single sectors distributing the treatment liquid, it being possible to start or interrupt said feeding, for each sector, by making use of gate valves (v) or taps applied upstream of each, or of part, of the single elbow-shaped support ducts 9, as shown in FIG. 3.

Figure 6:
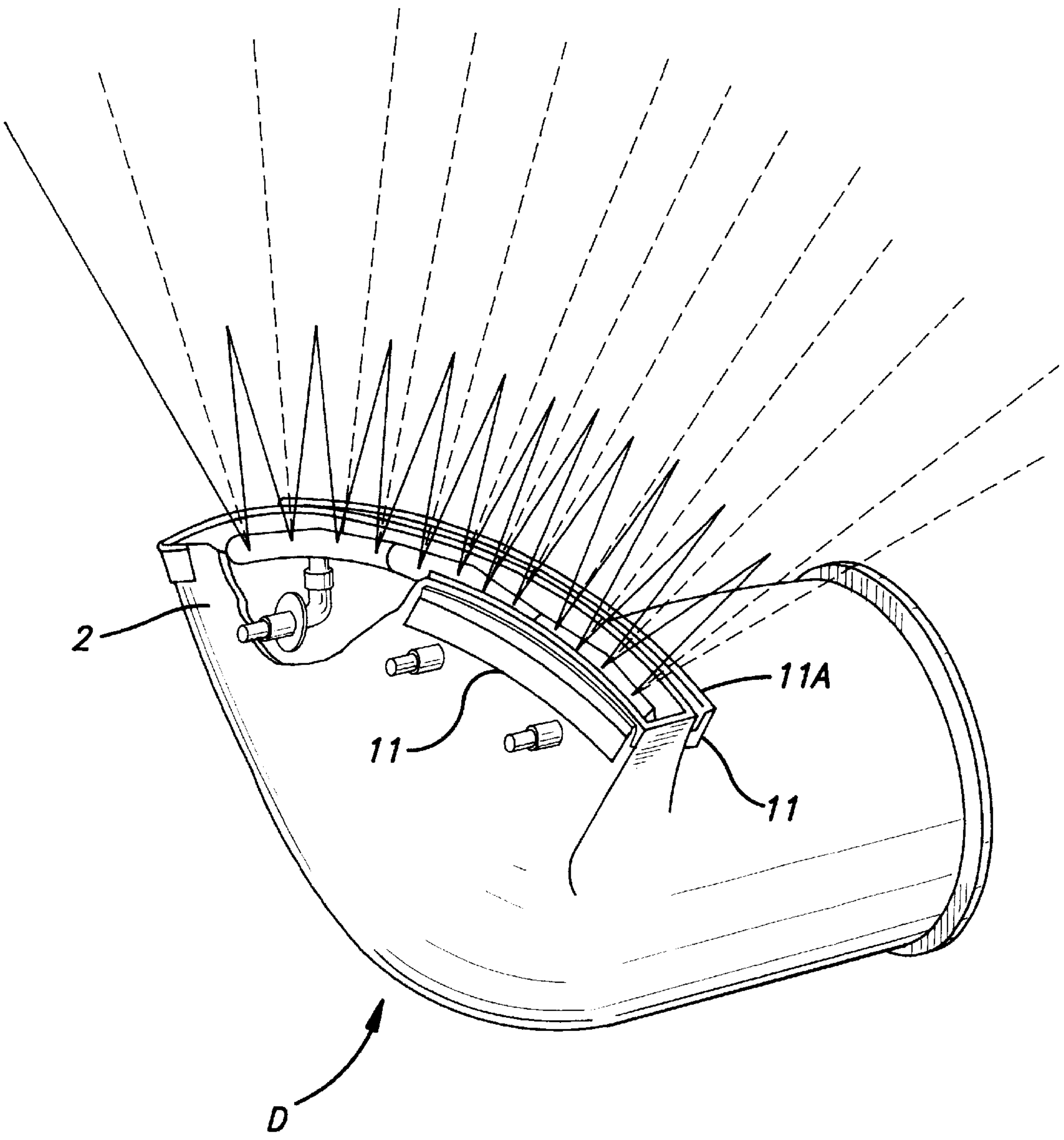
FIG. 6 is a perspective view, with some interrupted parts, of a second more elaborate embodiment of the fan-shaped diffuser according to the invention.
Figure 7:
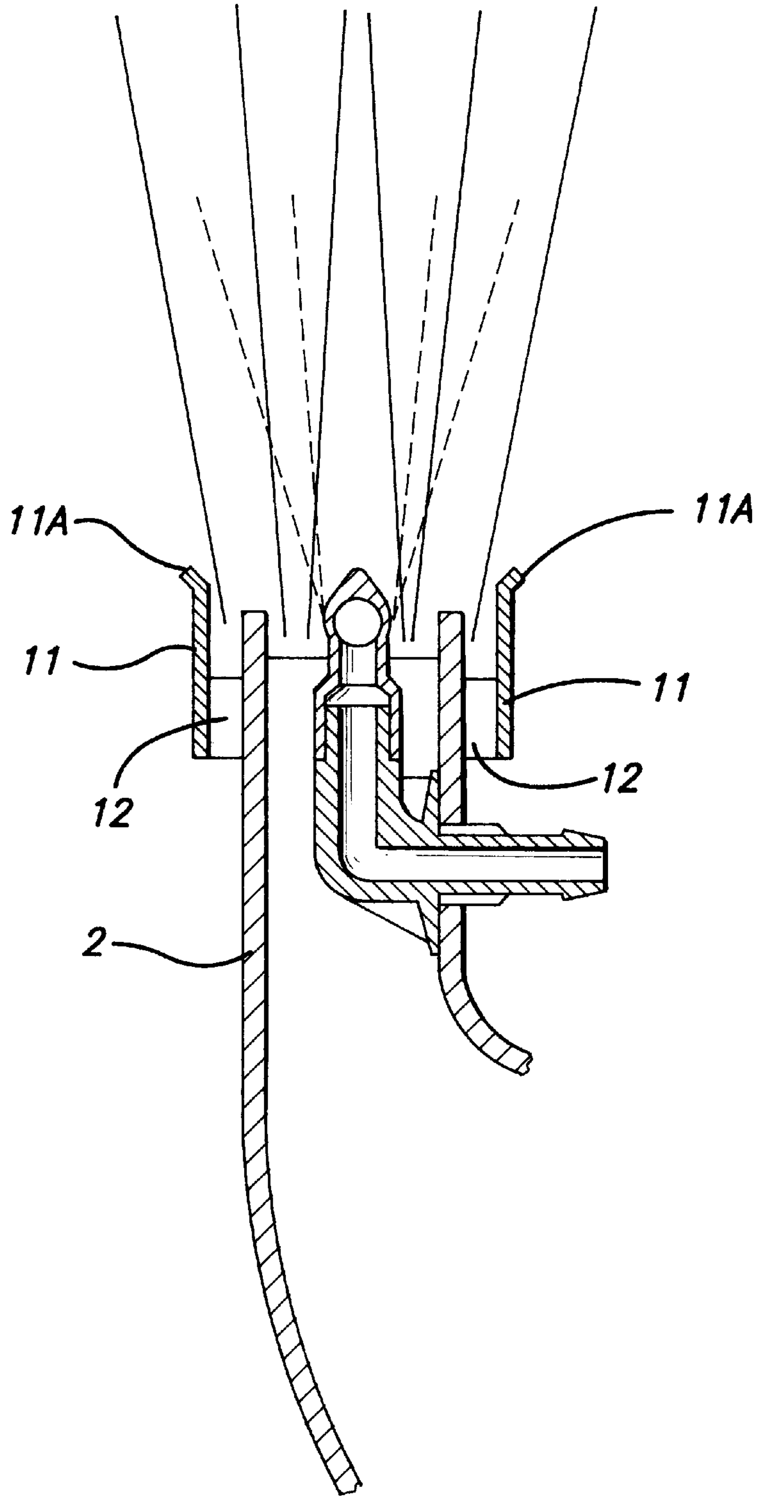
FIG. 7 is a cross section view of a detail of the diffuser shown in FIG. 6.

Further improvements can be obtained with the more elaborate and complete embodiment of the fan-shaped diffuser according to the invention illustrated in FIGS. 6 and 7.

As shown, in this embodiment the narrow fan-shaped opening 2, forming the square-bent end portion of the diffuser D, comprises on its outer surfaces two shaped flat strips 11, preferably of metal, extending parallel to and slightly spaced from said surfaces, along the two edges of said opening 2, from which they slightly project and to which they are fixed, with the interposition of spacing blocks 12 (FIG. 7), by any mechanical means—as, for example, rivets or screws—or, preferably, by glueing. The flat strips 11 are arc-shaped, like the edges of the opening 2 of the diffuser D, and their top part. 11A is slightly bent outwardly (see especially FIG. 7).

A diffuser like that shown in FIGS. 6 and 7 provides additional important advantages: its characteristic strips 11 are first of all meant to perform the important function of protecting the edges of the fan-shaped opening 2 of the diffuser, exposed to accidental impacts and, still more, to physiological attacks, on account of the cultivations having to be treated. The strips 11 are in fact apt to protect said edges from impacts in that they project therefrom, even if slightly, thus acting—also due to their metallic structure—as shock absorbers. This lengthens the life of the diffuser and makes it more efficient in use.

But furthermore, and above all, the presence of the strips 11 on the diffusers is apt to considerably improve the working of the atomizer: the suction effect produced by said strips externally to the edges of the fan-shaped opening 2, allows to obtain a very efficient spraying action, increasing the volume of the air mixing with the liquid; this improves the nebulization, reduces the turbulence and increases the capacity of penetration of the spray jet, with obvious improvements in the quality of the treatments being carried out.

I claim:

1. Diffuser for atomizers or mist blowers of treatment liquids in agriculture, comprising a large tube fed with air under pressure, ending into a narrow fan-shaped opening, and means for causing the treatment liquid to flow into said fan-shaped opening at a very low pressure, said means including a plurality of sectors for liquid distribution, positioned side-by-side in succession in at least one row along and centrally of said narrow fan-shaped opening, each of said sectors consisting of two straight tube lengths of synthetic plastic material, provided with gauged holes and mutually connected so as to form a wide angle between said sectors, and an angle of substantially 90° with a feeding duct, said two straight tube lengths of the liquid distribution sectors having a substantially wing-shaped section, with a trailing edge facing outwardly of the fan-shaped opening.

2. Diffuser according to claim 1, wherein said substantially wing-shaped section of the two straight tube lengths of the liquid distribution sectors have an outwardly dripping section.

3. Diffuser according to claim 1, wherein each tube length of the liquid distribution sectors includes a plurality of opposite equidistant gauged holes.

4. Diffuser according to claim 1, wherein the feeding duct of each liquid distribution sector is mounted onto an elbow-shaped support duct by screwing into a threaded bush.

5. Diffuser according to claim 4, further comprising a valve upstream of each elbow-shaped support duct for controlling the feeding of the treatment liquid to the corresponding distribution sector.

6. Diffuser according to claim 1, wherein the narrow fan-shaped opening has a square-bent end portion, and comprises on its outer surfaces, shaped flat strips extending parallel to and slightly spaced from said outer surfaces, along two edges of said fan-shaped opening, said shaped flat strips projecting slightly from the two edges of said fan-shaped opening.

7. Diffuser according to claim 6, wherein said shaped flat strips are made of metal.

8. Diffuser according to claim 6, wherein said shaped flat strips are arc-shaped, and have a top part which is slightly bent outwardly.

* * * * *

UNITED STATES PATENT AND TRADEMARK OFFICE

CERTIFICATE OF CORRECTION

PATENT NO. : 5,996,904

DATED : December 7, 1999

INVENTOR(S) : Paolo SMERALDI

It is certified that error appears in the above-indentified patent and that said Letters Patent is hereby corrected as shown below:

On the title page, insert Item [30] as follows:

--[30] Foreign Application Priority Data

Nov. 7, 1996 [IT] Italy........MI 96 A 02309--.

Signed and Sealed this

Fourth Day of July, 2000

Attest:

Q. TODD DICKINSON

Attesting Officer

*Director of Patents and Trademarks*